United States Patent
Takanashi

[11] Patent Number: 6,095,290
[45] Date of Patent: Aug. 1, 2000

[54] WEAR DETECTION PROBE FOR A BRAKING ELEMENT AND A BRAKING ELEMENT USING THE SAME

[75] Inventor: Hitoshi Takanashi, Yokkaichi, Japan

[73] Assignee: Sumitomo Wiring Systems, Ltd., Japan

[21] Appl. No.: 09/085,619

[22] Filed: May 27, 1998

[30] Foreign Application Priority Data

Jun. 12, 1997 [JP] Japan ................................. 9-154759
Feb. 26, 1998 [JP] Japan ................................. 10-45741

[51] Int. Cl.[7] .................................................. F16D 66/00
[52] U.S. Cl. ................................. 188/1.11 L; 188/1.11 E
[58] Field of Search ...................... 188/1.11 L, 1.11 W, 188/1.11 E; 340/454; 116/208; 73/129, 130

[56] References Cited

U.S. PATENT DOCUMENTS

| | | | |
|---|---|---|---|
| 3,556,258 | 1/1971 | Winge | 188/1.11 |
| 3,674,114 | 7/1972 | Howard | 188/1.11 |
| 5,168,260 | 12/1992 | Mery | 188/1.11 W |
| 5,302,940 | 4/1994 | Chen | 340/454 |
| 5,307,673 | 5/1994 | Ito et al. | 73/129 |
| 5,839,545 | 11/1998 | Preston et al. | 188/1.11 L |

FOREIGN PATENT DOCUMENTS

| | | |
|---|---|---|
| 0 465 954 A2 | 1/1992 | European Pat. Off. . |
| 0 610 828 A1 | 8/1994 | European Pat. Off. . |
| 0 669 481 A1 | 8/1995 | European Pat. Off. . |
| 41 20 527 | 1/1992 | Germany . |
| 354113760A | 9/1979 | Japan . |
| 6-4440 | 1/1994 | Japan . |

OTHER PUBLICATIONS

Document No. 20327, Vehicle brake lining wear sensor, London Transport Executive, p. 124, Mar. 1981.

Primary Examiner—Robert J. Oberleitner
Assistant Examiner—Thomas J. Williams
Attorney, Agent, or Firm—Anthony J. Casella; Gerald E. Hespos; Michael J. Porco

[57] ABSTRACT

A wear detection probe is provided for a braking element with a holder to prevent the displacement of a detection wire. The holder 11 is formed with an arrangement path assembly 14 including two through paths 15F, 15R arranged one before the other, a communication path 16 and two exposed paths 17L, 17R arranged side by side. A wear detection probe 10 is assembled by fitting a detection wire 18 into the arrangement path assembly 14. The arrangement path assembly 14 has bent paths, and the detection wire 18 is caught at the bent portions of the arrangement path assembly 14 even if a pulling force acts thereon. Thus, there is no likelihood that the detection wire 18 is displaced.

12 Claims, 6 Drawing Sheets

WEAR DETECTION PROBE FOR A BRAKING ELEMENT AND A BRAKING ELEMENT USING THE SAME

BACKGROUND OF THE INVENTION

1. Field of the Invention

The present invention relates to a wear detection probe of a braking element and to a braking element using the same.

2. Description of the Prior Art

Figure 10:
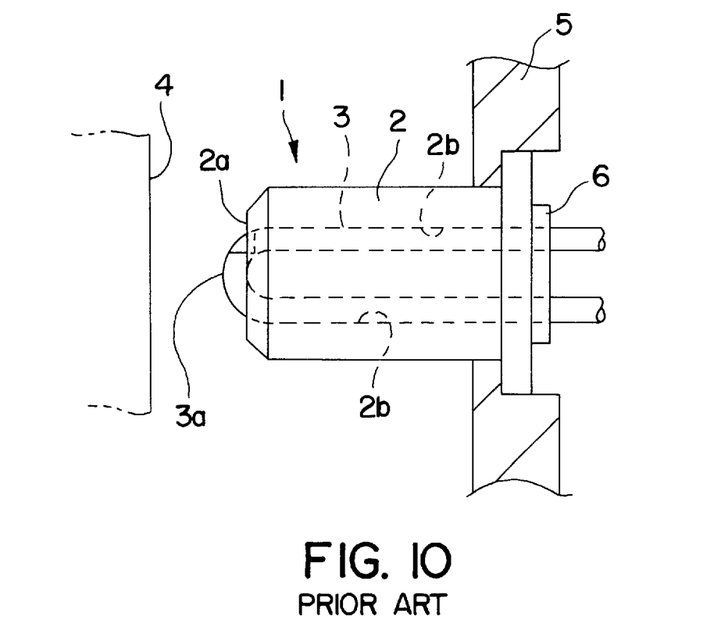
FIG. 10 is a side view of a prior art wear detection probe.

A wear detection probe for detecting the wear of a brake pad of an automotive vehicle to the degree that it cannot be used any longer or to an operating limit has been conventionally developed. This prior art wear detection probe is, as shown in FIG. 10, comprised of a detection wire 3 turned in U-shape and a holding member 2 for holding the detection wire 3 such that a turned portion 3a of the detection wire 3 is exposed from a leading end surface 2a. The wear detection probe 1 is mounted on a mount plate 5 of a brake pad (not shown) in such a manner that the turned portion 3a faces a disk rotor 4.

When the wear of the brake pad progresses, the wear detection probe 1 is exposed at the surface of the brake pad. If the brake pad is further worn, the turned portion 3a of the detection wire 3 also starts being worn. When the brake pad is worn to an operating limit, the detection wire 3 is broken. When an unillustrated detecting circuit connected with the detection wire 3 detects the broken wire, a warning lamp for notifying that the brake pad has been worn to the operating limit is turned on.

In this wear detection probe, as a means for holding the detection wire 3 in the holding member 2, two straight through paths 2b extending along forward and backward directions are formed in the holding member 2b; the opposite sides of the folded detection wire 3 are inserted into the through paths 2b from front; and the detection wire 3 is held by a retainer 6 at the rear end surface of the holding member 2.

The above prior art probe has the straight through paths 2b as the arrangement paths for the detection wire 3 in the holding member 2. Accordingly, when the turned portion 3a comes into contact with the disk rotor 4 and the detection wire 3 is strongly pulled forward, the detection wire 3 may be displaced in withdrawal direction against the holding force of the retainer 6.

In view of the above problem, an object of the present invention is to prevent a displacement of a detection wire.

SUMMARY OF THE INVENTION

According to the invention, there is provided a wear detection probe for a braking element, comprising a detection wire substantially assembled in a holder, wherein the holder can be integrally provided with the braking element. The holder is formed with an arrangement path assembly having at least one bent path and the detection wire is substantially fitted in the arrangement path assembly.

According to a preferred embodiment of the invention, there is provided a wear detection probe for a braking element which is constructed by assembling a detection wire in a holder, integrally provided with the braking element which can be brought into contact with a rotor, and adapted to detect whether or not the braking element has been worn or abraded to an operating limit by detecting whether or not the detection wire has been broken or interrupted. The holder is formed with an arrangement path assembly having at least one bent path and the detection wire is fitted in the arrangement path assembly. Accordingly, detection wire is fitted in the arrangement path assembly having the bent path. Thus, even if a pulling force acts on the detection wire, the displacement thereof can be prevented since the detection wire is caught at the bent portion of the arrangement path assembly. Preferably, the bent path is arranged at an angle different from 0° or 180°, and preferably substantially normal to a longitudinal direction of the holder. Accordingly, even if a backward pulling force acts on the two ends or only one end of the detection wire, the displacement of the detection wire can be securely prevented.

The bent path may be formed as through path or hole and/or as surface groove in the holder. Accordingly, the detection wire is even more securely arranged in the holder and a displacement thereof is effectively prevented.

The arrangement path assembly may comprise at least one exposed path which is substantially open in the outer surface of the holder. The arrangement path assembly also may comprise at least one through path which extends through the holder at an angle different from 0° or 180°, and preferably substantially normal or transverse to the longitudinal axis thereof in such a manner as to substantially cross the holder and is bent to be substantially continuous with the exposed path.

The arrangement path assembly preferably comprises an exposed path which is open in the outer surface of the holder and extends along the length of the holder. A through path preferably extends through the holder in such a manner as to cross the holder and is bent to be continuous with the exposed path. If a pulling force acts on the detection wire, the detection wire is caught at the bent communicating portion of the through path and the exposed path. This prevents the detection wire from being displaced.

According to a further preferred embodiment, the through path is provided substantially at the leading end of the holder and the detection wire is broken at a portion accommodated in the through path.

Since a breakable portion of the detection wire is accommodated in the through path, even if a pulling force acts thereon in the rotation direction of a rotor when being brought into contact with the rotor, this pulling force is received by the inner wall of the through path. Accordingly, the displacement of the detection wire due to the pulling by the rotor can be prevented.

Preferably, a plurality of through paths are formed. Accordingly, there are many bent portions in the arrangement path assembly. Thus, the displacement of the detection wire due to pulling by the rotor can be more effectively prevented.

At least one exposed path may comprise at least one curved or transverse portion being formed preferably as an open groove on the surface of the holder. The curved or transverse portion may extend at an angle different from 0° or 180°, and preferably substantially normal to the extending direction of the exposed path. Since the detection wire can or must be forcibly bent to be fitted in the curved or transverse portion (or bent path) formed in the exposed path, the detection wire is strongly pressed against the inner wall of the bent path due to the elastic restoring force thereof, and thereby is prevented from coming out of the bent path.

Two or more exposed paths may be provided in a spaced relationship. The two or more exposed paths may be arranged side by side or at two substantially opposed surfaces on the holder. Accordingly, since the through paths preferably extend in a direction arranged at an angle different from 0° or 180°, and preferably substantially normal to the pulling force acting direction, the displacement of the detection wire resulting from the pulling force can be more securely prevented as compared with a case where only one such path is formed.

The arrangement path assembly, and preferably the exposed path thereof may be provided, at least partially, with a disengagement restricting means for restricting the displacement of the detection wire toward the outer surface of the holder. Accordingly, the detection wire, once fitted in the arrangement path assembly or the exposed path, can be held therein since the displacement thereof toward the outer surface of the holder is prevented by the disengagement restricting means.

According to the invention, there is further provided a braking device for an automotive vehicle, comprising a braking element, a mating braking element, preferably a rotor and a wear detection probe. The wear detection prove preferably comprises a detection wire substantially assembled in a holder. The holder is integrally provided or providable with the braking element which can be brought into contact with a mating braking element, preferably a rotor. The wear detection probe is adapted to detect whether or not the braking element has been worn or abraded to an operating limit by detecting whether or not the detection wire has been broken or interrupted. The detection wire may comprise a breakable portion which is to be broken or interrupted when the braking element reaches its operating limit. The breakable portion is arrangeable substantially parallel to the mating breaking element. Thus, the displacement of the detection wire caused by the pulling force of the mating braking element, preferably the rotor can be prevented.

These and other objects, features and advantages of the present invention will become more apparent upon a reading of the following detailed description and accompanying drawings.

DETAILED DESCRIPTION OF THE PREFERRED EMBODIMENTS

A wear detection probe 10 according to a first embodiment of this invention is suitable e.g. for a known disk rotor of a vehicle for effecting braking by tightly holding the opposite surfaces of a disk-shaped rotor R rotatable together with an unillustrated wheel by brake linings B (braking element). The probe 10 is fixed by being juxtaposed with the brake linings B to a support plate P to which the brake linings B are fixed. When the brake linings B are thinned to a specified value as the wear of the brake lining B progresses, a front part of the probe 10 is brought into contact with the rotor R and a detection wire 18 is thereby worn and broken. As a result, the wear of the brake linings B to an operating limit can be detected.

The probe 10 is comprised of a holder 11 and the detection wire 18. The detection wire 18 is of a known type in which a metal braided wire is covered by a resin coating. The holder 11 is made of a heat resistant resin material and preferably has a substantially cylindrical portion 11A, a large diameter portion 11B which is preferably concentrically continuous, in particular integral or unitary with the rear end of the cylindrical portion 11A and a thick plate portion 11C projecting from the rear end surface of the large diameter portion 11B. The holder 11 is formed with an arrangement path assembly 14 for holding or positioning the detection wire 18 therein.

The arrangement path assembly 14 includes two through paths 15F, 15R arranged one after the other, a communication path 16 and exposed paths 17L, 17R arranged preferably substantially side by side. The through paths 15F, 15R are through paths extending at an angle different from 0° or 180°, preferably vertically extending through paths formed in two positions spaced apart along forward and backward directions substantially at a front end portion of the cylindrical portion 11A. The communication path 16 is a substantially exposed path which is open in the outer, preferably lower surface of the cylindrical portion 11A and communicates the bottom openings of the through paths 15F, 15R. The exposed paths 17L, 17R are elongated grooves substantially extending along forward and backward directions which are opening in the outer, preferably upper surfaces of the cylindrical portion 11A, the large diameter portion 11B and the plate portion 11C. The rear ends of the exposed paths 17L, 17R are both open in the rear end surface of the plate portion 11C. The front end of the first exposed path 17L which is at the first or left side (lower side in FIG. 2) of the two exposed paths 17L, 17R when viewed from above extends to a position in vicinity of the front end of the holder 11 and is slightly bent substantially transversely to the longitudinal direction A of the cylindrical portion 11A, preferably to the right to substantially communicate with the front through path 15F. On the other hand, the front end of the second or right exposed path 17R is slightly bent to the left to communicate with the rear through path 15R.

The arrangement path assembly 14 as above forms a substantially continuous arrangement path assembly in the holder 11 which extends from the first or left exposed path 17L through the front through path 15F, the communication path 16 and the rear through path 15R to the second or right exposed path 17R and has bent portions. The width of the arrangement path assembly 14 is set substantially equal to the outer diameter of the resin coating of the detection wire 18.

Figure 1:
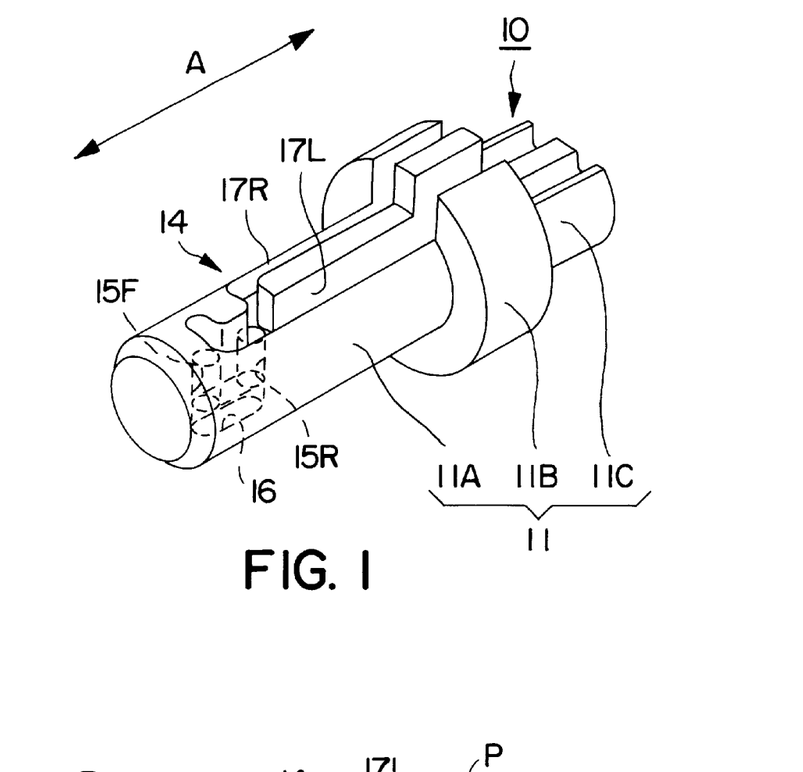
FIG. 1 is a perspective view of a first embodiment before a detection e is fitted.
Figure 2:
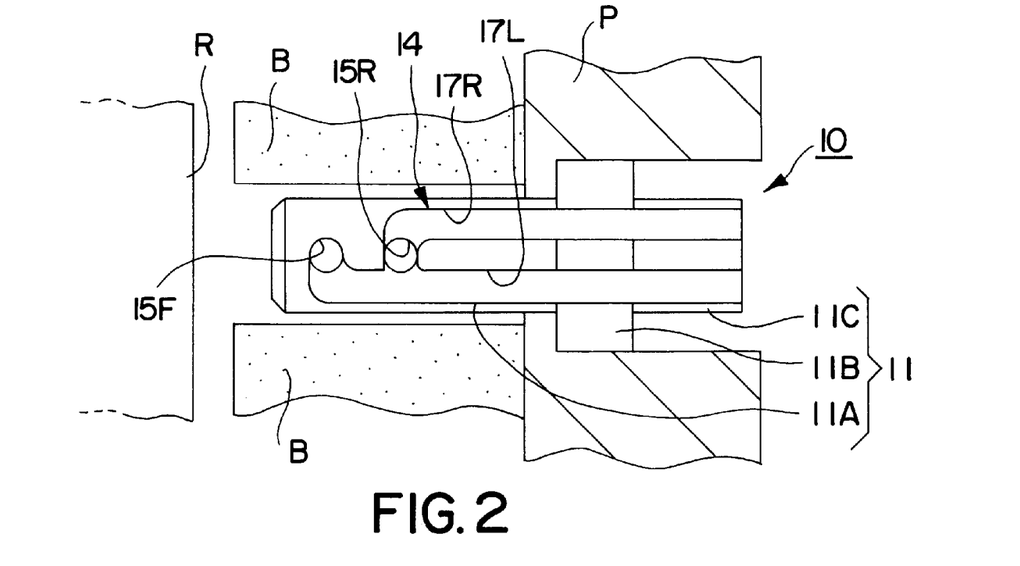
FIG. 2 is a plan view of the first embodiment before the detection wire is fitted.
Figure 3:
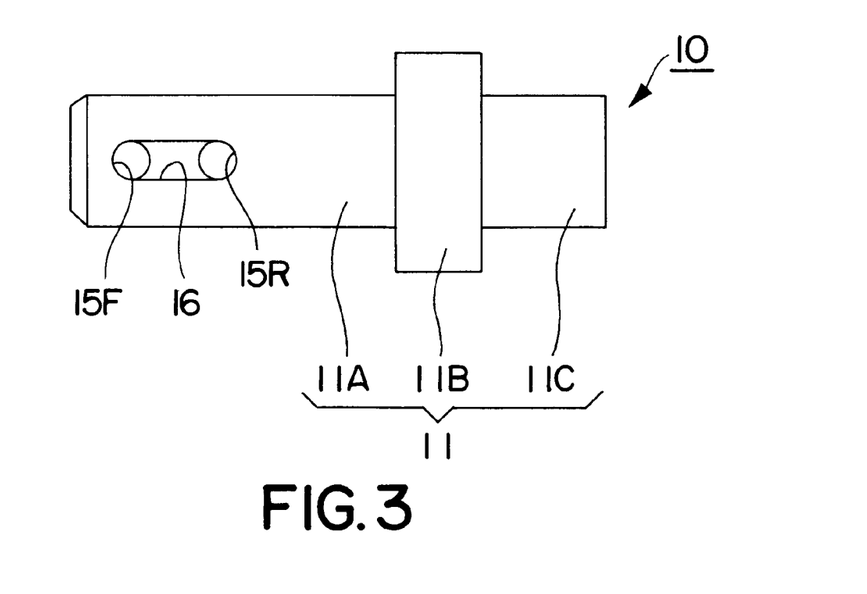
FIG. 3 is a bottom view of the first embodiment before the detection wires fitted.
Figure 4:
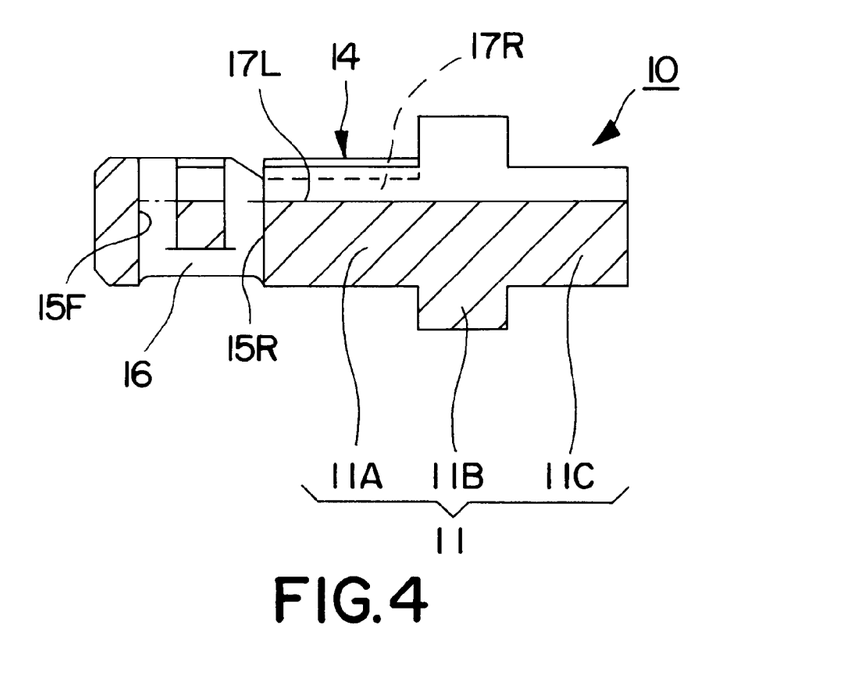
FIG. 4 is a section of the first embodiment before the detection wire is fitted.
Figure 5:
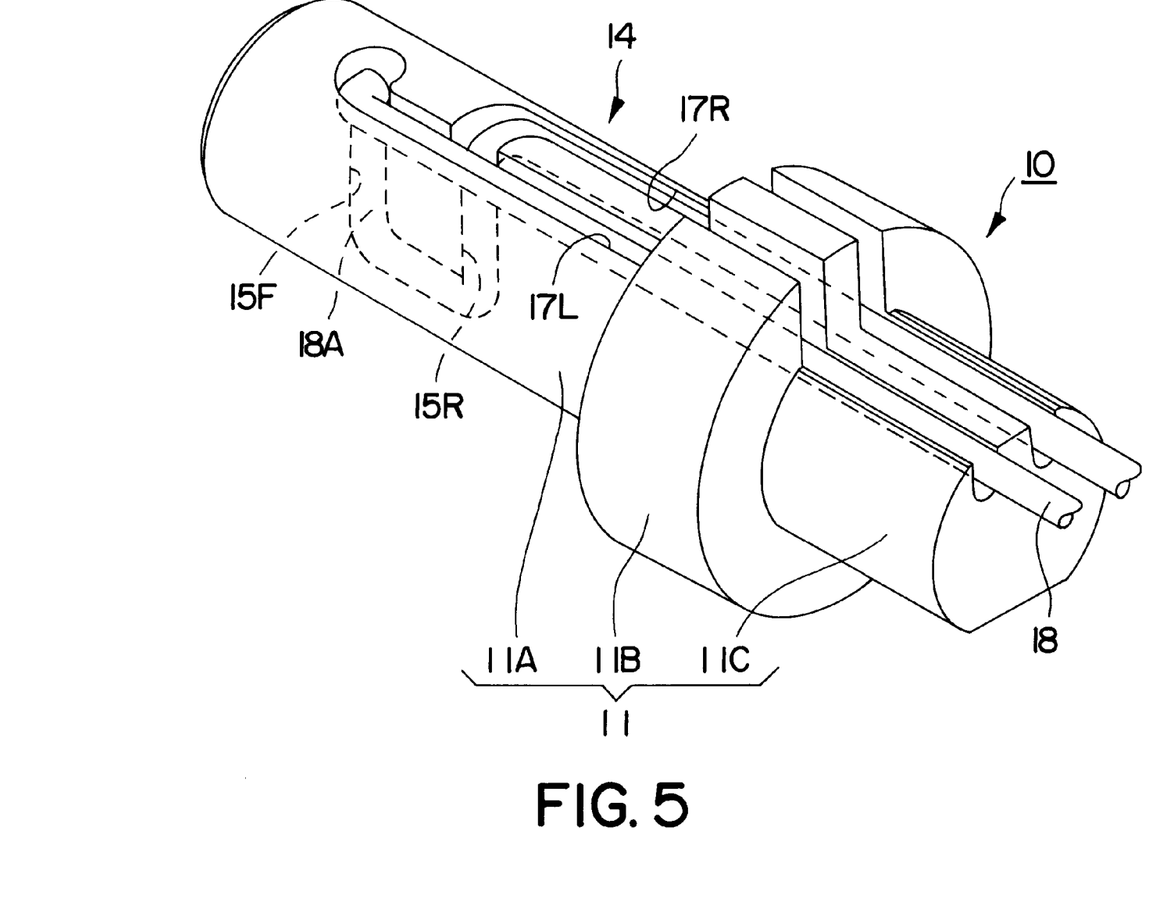
FIG. 5 is a perspective view of the first embodiment with the detection wire fitted therein.

The detection wire 18 is arranged in the arrangement path assembly 14 as follows. The detection wire 18 is substantially folded in two, and the ends thereof are inserted through the front and rear through paths 15F, 15R from below of the holder 11. A portion of the detection wire 18 coming out of the front through path 15F is fitted into the first or left exposed path 17L, and a portion thereof coming out of the rear through path 15R is fitted into the second or right exposed path 17R. Finally, the ends of the detection wire 18 are pulled out from the rear end of the plate portion 11C.

A portion of the detection wire 18 arranged in the holder 11 which passes through the front through path 15F serves as a breakable portion 18A. When the brake linings B are worn to the operating limit, this breakable portion 18A is abraded with the front end of the cylindrical portion 11A and is broken.

It should be noted that the breakable portion 18A is so arranged in the through path 15F as to extend in the substantially same direction as the rotating direction of the rotor R.

The opposite ends of the detection wire 18 pulled out of the holder 11 are connected with an unillustrated breakage detecting circuit.

During the arrangement of the detection wire 18, the detection wire 18 is bent by being pressed e.g. by finger at continuous portions of the communication path 16 with the through paths 15F, 15R since the communication path 16 is open to the outside of the holder 11. At a continuous portion of the front through path 15F and the first or left exposed path 17L and a continuous portion of the rear through path 15R and the second or right exposed path 17R, the detection wire 18 is bent by being pressed, e.g. by a finger, since the exposed paths 17L, 17R are open to the outside. Thus, slackening of the detection wire 18 at the bent portions at the upper and lower ends of the through paths 15F, 15R can be prevented.

Since the width of the exposed paths 17L, 17R are substantially equal to that of the detection wire 18, the detection wire 18 is substantially closely fitted into the exposed paths 17L, 17R. In addition, since wires normally have a tendency of being bent, a part of the fitted detection wire 18 is pressed strongly against the inner walls of the exposed paths 17L, 17R because of this tendency. This prevents the detection wire 18 from easily coming out of the exposed paths 17L, 17R.

As described above, the wear detection probe 10 of this embodiment is assembled by fitting the detection wire 18 in the arrangement path assembly 14 having the bent portions and formed in the holder 11. Accordingly, even if a backward pulling force acts on the two ends or only one end of the detection wire 18, the displacement of the detection wire 18 can be prevented securely.

Further, since the two through paths 15F, 15R extending in a direction arranged at an angle different from 0° or 180°, preferably substantially normal to the pulling force acting direction are formed, the displacement of the detection wire 18 resulting from the pulling force can be prevented more securely as compared with a case where only one such path is formed.

The through paths 15F, 15R of the arrangement path assembly 14 are substantially short because they extend in a direction crossing the holder 11. Thus, as compared with a case where the through paths 15F, 15R are through paths extending along the length of the holder 11, the detection wire 18 is less likely to be buckled and/or caught while being passed therethrough. Further, since the exposed paths 17L, 17R extend substantially along the length of the holder 11 and are open in the outer surface of the holder 11, the detection wire 18 can be easily fitted into the exposed paths 17L, 17R. In other words, the detection wire 18 can be easily arranged in the arrangement path assembly 14.

Figure 6:
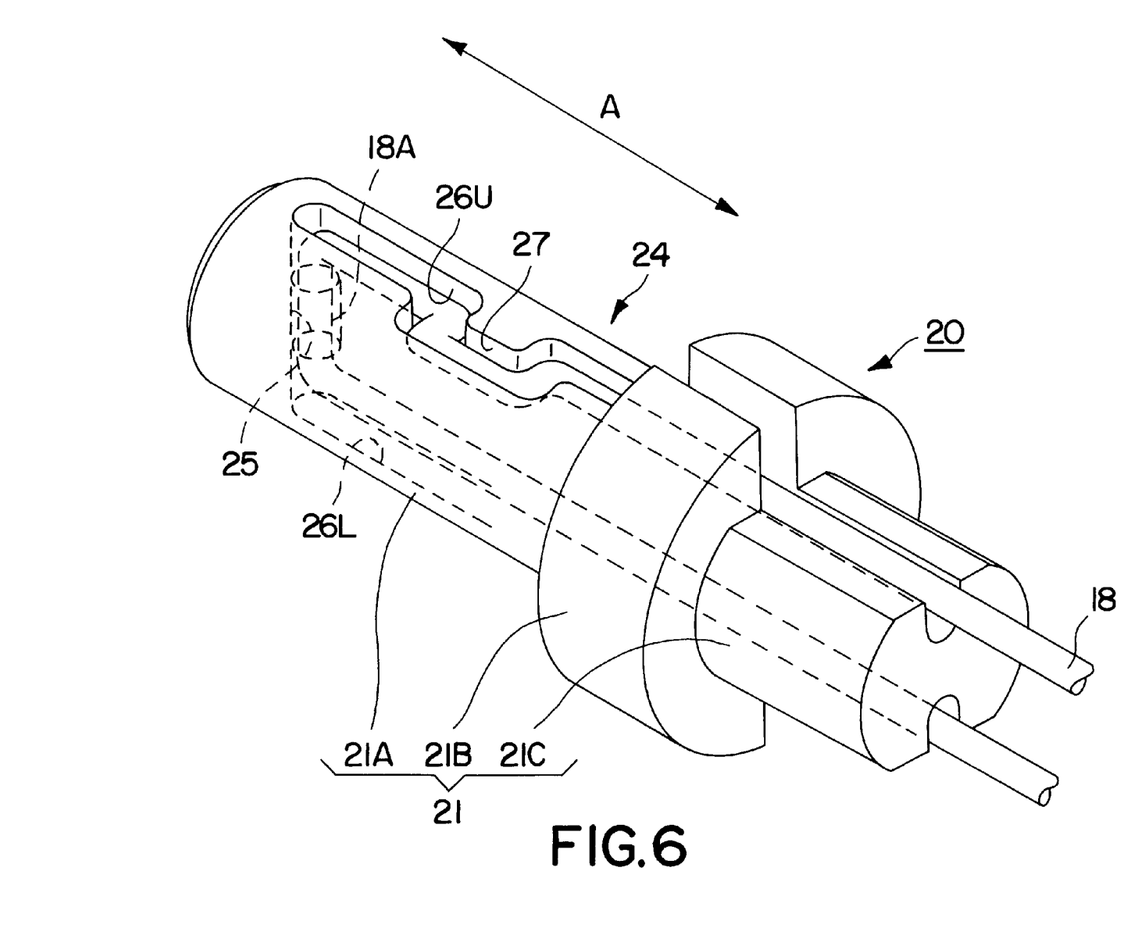
FIG. 6 is perspective view of a second embodiment with a detection wire fitted therein.

Next, a second embodiment of the invention is described with reference to FIG. 6.

This embodiment has an arrangement path assembly having a construction different from the first embodiment. Since the other construction is similar or same as the first embodiment, no description is given on the structure, action and effects thereof by identifying it by the similar or same reference numerals.

A wire arrangement path assembly 24 of a wear detection probe 20 of the second embodiment includes one through path 25 and two exposed paths 26U, 26L arranged one above the other. The through path 25 extends at an angle different from 0° or 180°with respect to the longitudinal direction A of a substantially cylindrical portion 21A. The through path 25 preferably vertically extends in a front end portion of the cylindrical portion 21A, and a portion of a detection wire 18 passing through the through path 25 serves as a breakable portion 18A. The first or upper exposed path 26U and the second or lower exposed path 26L are open in the first or upper and second or lower surfaces of the cylindrical portion 21A. The first and second surfaces preferably are substantially opposed to each other. A large diameter portion 21B and a plate portion 21C, and the rear ends thereof are open in the rear end surface of the plate portion 21C. A part of the first or upper exposed path 26U is formed into a bent path 27 which is bent substantially in U-shape or bent along a direction at an angle different from 0° or 180°, preferably substantially normal or transversal to the longitudinal direction A of the cylindrical portion 21A. This bent path also is preferably open in the outer surface of the holder 21.

The detection wire 18 is arranged in the arrangement path assembly 24 as follows. The detection wire 18 is passed through the through path 25 while being held substantially straight, and is bent at angles different from 0° or 180°, preferably substantially at right angles at the first or upper and second or lower ends of the through path 25. Portions of the detection wire 18 toward the opposite ends thereof from the bent portions are fitted in the first or upper and second or lower exposed paths 26U, 26L, and the ends thereof are pulled, e.g. backwardly from the plate portion 21C.

Since the detection wire 18 is forcibly bent to be fitted in the bent path 27 formed in the first or upper exposed path 26U, the detection wire 18 is strongly pressed against the inner wall of the bent path 27 due to the elastic restoring force thereof, thereby being prevented from coming out of the bent path 27.

Similar to the first embodiment, the wear detection probe 20 of the second embodiment is assembled by fitting the detection wire 18 in the arrangement path assembly 24 having the bent path 27 formed in the holder 21. Accordingly, even if a backward pulling force acts on the two ends or only one end of the detection wire 18, the displacement of the detection wire 18 can be prevented securely.

Figure 7:
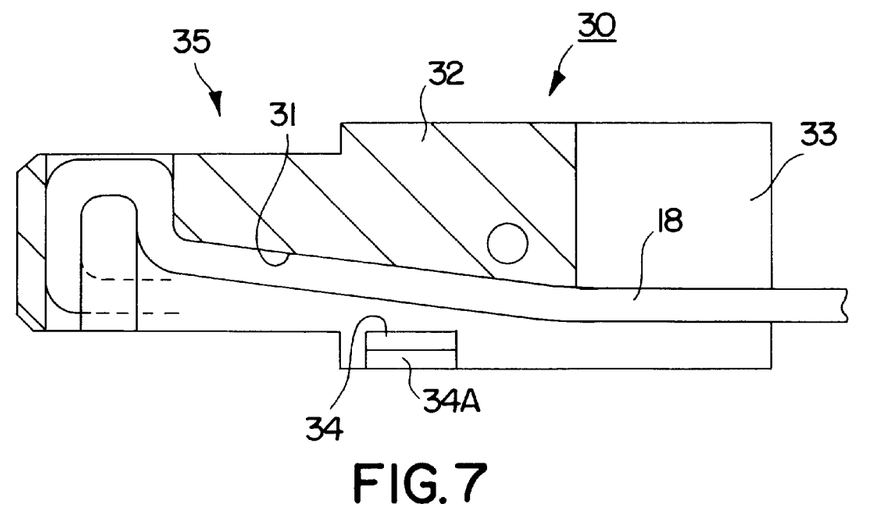
FIG. 7 is a vertical section of a wear detection probe according to a third embodiment.
Figure 8:
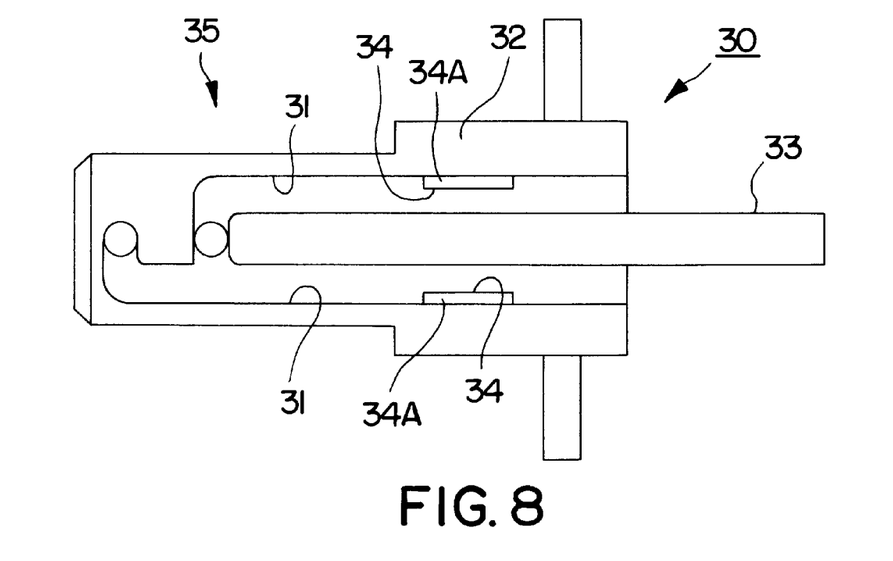
FIG. 8 is a bottom view of the detection probe according to the third embodiment.
Figure 9:
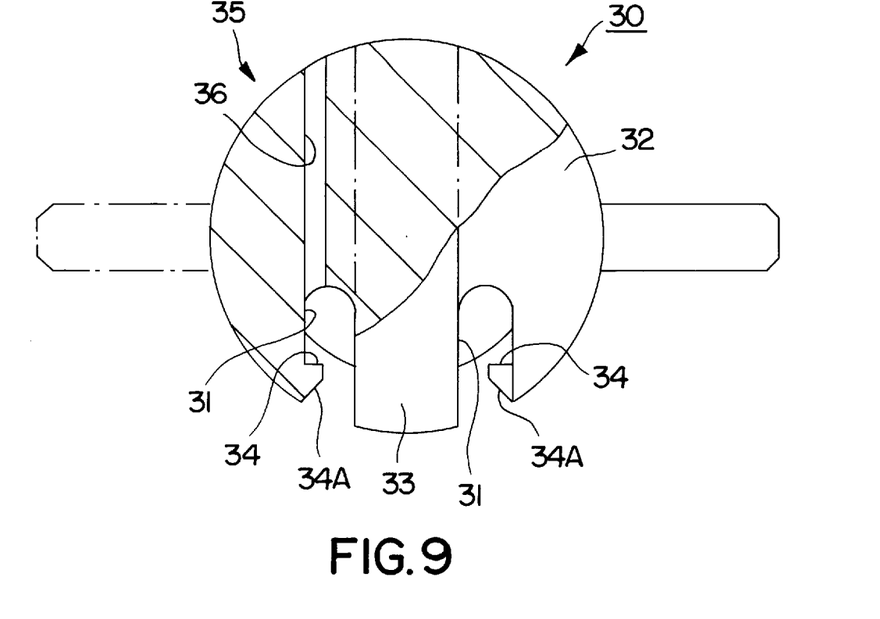
FIG. 9 is an enlarged rear view partly in section of the third embodiment.

In the third embodiment, as shown in FIGS. 7–9, a disengagement restricting means for the detection wire 18 is provided in each exposed path 31 of a wear detection probe 30. The wear detection probe 30 has substantially the same basic construction as the wear detection probe 10 according to the first embodiment and the construction other than the disengagement restricting means portion of the wear detection probe 30 is substantially same as the one according to the first embodiment. Thus, no description is given on the structure, action and effects thereof by identifying it by the same or similar reference numerals.

The wear detection probe 30 of the third embodiment differs from the wear detection probe 10 of the first embodiment in that a substantially platelike rib 33 projects at the rear end of or an end substantially at a distance or opposed to an enlarged portion 32 and that the exposed paths 31 are interrupted substantially at the rear end of the enlarged portion 32. At the opening edges of the exposed paths 31 toward the enlarged portion 32 are formed restricting portions 34 (disengagement restricting means) which project substantially inwardly. A ratio of the entire width of the exposed path 31 to the projecting length of the restricting portion 34 can be set arbitrarily. In this embodiment, the projecting length of the restricting portion 34 is about ¼ to ⅓ of the entire width of the exposed path 31 so as to provide such a clearance in which the detection wire 18 can be fitted while being deformed. Preferably the restricting portion 34 is arranged more toward the rear part or portion of the exposed path 31. To facilitate the insertion of the detection wire 18, the outer surfaces of the restricting portions 34 are formed into slanted surfaces 34A. A holder 35 is formed by a mold (not shown) which can be half-opened in a direction normal to the longitudinal axis thereof (vertical direction in FIGS. 7 and 9). The enlarged portion 32 preferably is formed with a mold removing hole 36 for forming the corresponding restricting portions 34.

Since the exposed paths 31 are formed with the restricting portions 34 as described above, the detection wire 18 once fitted in the exposed paths 31 is caught at least partially by the restricting portions 34. This prevents the detection wire 18 from being substantially displaced from the exposed paths 31 toward the outer surface (lower surface in FIG. 7). In other words, the detection wire 18 can be held securely fitted in the exposed paths 31.

As modifications of the third embodiment, the restricting portions may be so formed as to extend over the substantially entire widths of the exposed paths 31 or may be formed in a plurality of positions spaced along the longitudinal axes of the exposed paths 31. Further, the restricting portions 34 may project not only at the outer opening edges of the exposed paths 31 (at the right side in the right exposed path 31 of FIG. 9), but also at the inner opening edges of the exposed paths 31. In the case that the restricting portions 34 are provided in a plurality of positions, they may be alternately formed at the outer and inner opening edges.

The present invention is not limited to the described and illustrated embodiments. For example, the following embodiments are embraced by the technical scope of the present invention. Besides the following embodiments, a variety of changes can be made without departing the spirit and scope of the present invention as defined in the claims.

Although the breakable portion 18A of the detection wire 18 is accommodated inside the holder in the foregoing embodiments, it may be exposed at the front end surface of the holder according to the invention, the holder having preferably a surface groove or path formed in the front end thereof.

Although the holder is formed with the through path(s) crossing it in the foregoing embodiments, the arrangement path assembly may be comprised of all exposed paths which are open in the outer surface of the holder without providing any through path according to the invention.

Although two through paths are provided in the first embodiment and one through path is provided in the second embodiment, three or more through paths may be provided according to the invention.

Although two through paths are spaced apart along forward and backward directions in the first embodiment, they may be spaced apart along a direction at an angle different from 0° or 180° to the longitudinal direction of the cylindrical portion, preferably along a transverse direction according to the invention.

Although two through paths are parallel with each other in the first embodiment, they may extend at different angles when the holder is viewed from front or obliquely extend at different angles when the holder is viewed sideways according to the invention.

Although the displacement of the detection wire 18 is prevented by providing the bent path 27 in the exposed path 26U in the second embodiment, the exposed path may not be provided with a bent path according to the invention.

Although the invention is applied to the wear detection probe for a disk brake in the foregoing embodiments, it may be applied to a wear detection probe for a drum brake.

Although the width of the wire arrangement path assemblies is preferably substantially equal to the thickness or width of the wires, the width may be greater to the thickness of the wires and the interstice or spacing may be preferably substantially filled with a resin, glue or the like filling material.

What is claimed is:

1. A wear detection probe for a braking element, comprising a detection wire assembled in a unitarily formed holder, the holder being substantially elongated and having opposed front and rear ends and an outer surface, wherein the holder is formed with an arrangement path assembly having a first longitudinal path exposed to the outer surface and extending from the rear end of the holder to a front terminus spaced rearwardly of the front end of the holder, a first front transverse path exposed to the outer surface and extending angularly from the front terminus of the first longitudinal path to a first front transverse path terminus spaced from the first longitudinal path, a second front transverse path extending from the first front transverse path terminus through the holder and aligned substantially transversely to both the first front transverse path and the first longitudinal path, the second front transverse path extending to a second front transverse path terminus disposed at a location on the outer surface of the holder substantially opposite the first front transverse path, a communication path extending rearwardly from the second front transverse path terminus to a communication path terminus, a first rear transverse path extending transversely through the holder from the communication path terminus to a first rear transverse path terminus, a second rear transverse path exposed to the outer surface and extending from the rear front transverse path terminus and being aligned substantially transversely to both the communication path and the first rear transverse path, and a second longitudinal path exposed to the outer surface and extending angularly from the second rear transverse path and parallel to the first longitudinal path to the rear end of the holder, the detection wire being fitted in the arrangement path assembly, whereby portions of the detection wire in the front transverse path are abradable for detecting wear of the braking element, and whereby the arrangement path assembly holds the detection wire in the holder.

2. A wear detection probe according to claim 1, wherein each said path that is exposed to the outer surface is at least partially provided with a disengagement restricting means for restricting displacement of the detection wire toward the outer surface of the holder.

3. A braking device for an automotive vehicle, comprising:

a support plate having a mounting aperture formed therethrough;

a braking element having a rear face mounted to the support plate and an opposed front face, an aperture extending through the braking element from the front face to the rear face thereof and substantially aligned with the mounting aperture in the support plate, a mating braking element in opposed facing relationship to the front face of the braking element, and a wear detection probe comprising a detection wire and a holder, the holder being elongated with opposed front and rear ends, the rear end of the holder being mounted to the support plate, such that a portion of the holder passes through the mounting aperture of the support plate, portions of the holder adjacent the front end thereof being mounted in the braking element which can be brought into contact with the mating braking element, the wear detection probe being operative to detect whether the braking element has been worn to an operating limit by detecting whether the detection wire has been broken, the holder being unitarily formed to include a plurality of wire receiving paths for receiving portions of the detection wire, the wire receiving paths comprising a first longitudinal wire receiving path extending substantially longitudinally along the holder from the rear end of the holder to a front terminus in proximity to but rearwardly of the front end of the holder, a front transverse path extending transversely across the holder from the front terminus of the first longitudinal path, the front transverse path having a transverse terminus opposite the first longitudinal path, a communication path extending from the transverse terminus toward the rear end of the holder, at least one bent path extending transversely from the communication path, and a second longitudinal path extending parallel to the first longitudinal path to the rear end of the holder, said detection wire extending into the first longitudinal path, through the front transverse path, the communication path, the bent path and rearwardly out of the holder through the second longitudinal path, whereby the paths securely retain the detection wire in the holder.

4. A braking device according to claim 3, wherein the detection wire comprises a breakable portion which is to be broken when the braking element reaches its operating limit, wherein the breakable portion is substantially parallel to the mating breaking element.

5. A braking device according to claim 3, wherein the first and second longitudinal paths and the communication path define grooves open to exterior portions of the holder for facilitating placement of the detection wires into the holder.

6. A braking device according to claim 3, wherein the communication path is on a longitudinal side of the holder substantially opposite the first and second longitudinal paths.

7. A braking device according to claim 6, wherein the at least one bent path comprises a rear transverse path extending from the communication path substantially parallel to the front transverse path and a curved path extending from the rear transverse path to the second longitudinal path.

8. A braking device according to claim 3, wherein the first longitudinal path is on a side of the holder substantially opposite the communication path and the second longitudinal path.

9. A braking element according to claim 8, wherein the at least one bent path comprises an intermediate transverse path extending perpendicularly from the communication path, a third longitudinal path extending rearwardly from the intermediate transverse path and a rear transverse path extending from the third longitudinal path to the second longitudinal path.

10. A braking device according to claim 3, wherein the front transverse path, the communication path and the bent path are surrounded by the braking element.

11. A were detection probe for a braking element, comprising a detection wire assembled in a unitarily formed folder, the wire having a longitudinal axis, the holder being substantially elongated and having opposed front and rear ends, the holder being formed with an arrangement path having a plurality of path sections, said path sections being cross-sectionally dimensioned for clamped engagement of the detection wire therein, said sections being disposed relative to one another such that the clamped wire is bent about a plurality of bend axes to form a plurality of wire bends and for disposition of said wire in said path sections, each said bend axis being perpendicular to the longitudinal axis of the wire in the respective bends, and the plurality of the bend axes being non-parallel to one another, whereby portions of the detection wire in a path section in proximity to said front end of said holder are abradable for detecting wear of the braking element, and whereby the bending of the wire about the plurality of non-parallel axes securely holds the detection wire in the holder.

12. A wear detection probe for a braking element, comprising a detection wire assembled in a unitarily formed holder, the holder being substantially elongated and having opposed front and rear ends, the holder being formed with an arrangement path having a plurality of path sections, the path sections comprising a first plurality of path sections aligned transversely to one another defining a first plane and a second plurality of path sections aligned transversely to one another and defining a second plane, said second plane being aligned to intersect the first plane, said path sections further being cross-sectionally dimensioned for clamped engagement of the detection wire therein, whereby portions of the detection wire in one said path in proximity to said front end of said holder are abradable for detecting wear of the braking element, and whereby the transverse path sections disposed in different respective planes securely hold the detection wire in the holder.

* * * * *